United States Patent
Song

(10) Patent No.: US 7,328,781 B2
(45) Date of Patent: Feb. 12, 2008

(54) DEVICE FOR VARYING STROKE OF CLUTCH PEDAL

(75) Inventor: Young Suck Song, Ulsan (KR)

(73) Assignee: Hyundai Motor Company, Seoul (KR)

( * ) Notice: Subject to any disclaimer, the term of this patent is extended or adjusted under 35 U.S.C. 154(b) by 251 days.

(21) Appl. No.: 11/305,735

(22) Filed: Dec. 15, 2005

(65) Prior Publication Data

US 2007/0125616 A1    Jun. 7, 2007

(30) Foreign Application Priority Data

Dec. 6, 2005    (KR) .................... 10-2005-0118356

(51) Int. Cl.
*F16D 23/12* (2006.01)
*G05G 5/04* (2006.01)

(52) U.S. Cl. ................. 192/99 S; 192/109 R; 74/512

(58) Field of Classification Search ........... 192/111.11, 192/111.12
See application file for complete search history.

(56) References Cited

U.S. PATENT DOCUMENTS

| | | | | | |
|---|---|---|---|---|---|
| 3,286,803 | A | * | 11/1966 | Zeidler | 192/70.252 |
| 3,800,929 | A | * | 4/1974 | Morris | 192/99 S |
| 4,424,890 | A | * | 1/1984 | Duethman | 192/111.12 |
| 4,671,397 | A | | 6/1987 | Asagi et al. | |
| 5,489,011 | A | * | 2/1996 | Reed et al. | 192/111.12 |
| 5,957,806 | A | | 9/1999 | Hirose et al. | |

* cited by examiner

*Primary Examiner*—Richard M. Lorence
*Assistant Examiner*—Edwin A Young
(74) *Attorney, Agent, or Firm*—Morgan Lewis & Bockius LLP

(57) ABSTRACT

The present invention relates to a device for varying a stroke of a clutch pedal. More particularly, the present invention relates to a device for varying a stroke of a clutch pedal applied to a pedal unit of a clutch system of a manual transmission and varying an effective stroke of a clutch pedal depending on a vehicle speed signal and an engine RPM signal thereby preventing energy collision noise of a driving system.

5 Claims, 5 Drawing Sheets

DEVICE FOR VARYING STROKE OF CLUTCH PEDAL

CROSS-REFERENCE TO RELATED APPLICATION

This application claims priority to and the benefit of Korean Patent Application No. 10-2005-0118356 filed in the Korean Intellectual Property Office on Dec. 06, 2005, the entire contents of which are incorporated herein by reference.

BACKGROUND OF THE INVENTION (a) Field of the Invention

The present invention relates to a device for varying a stroke of a clutch pedal. More particularly, the present invention relates to a device for varying a stroke of a clutch pedal applied to a pedal unit of a clutch system of a manual transmission and varying an effective stroke of a clutch pedal depending on a vehicle speed signal and an engine RPM signal thereby preventing energy collision noise of a driving system.

(b) Description of the Related Art

Generally, a clutch system of a vehicle plays a role of selectively delivering power of an engine to a drive wheel, and temporarily cuts off power of an engine during an engine starting or a gear shifting of a transmission.

Such a clutch system can be divided into a mechanical type using a rod or a wire and a hydraulic pressure type using hydraulic pressure depending on an operating power transmission method.

FIG. 5 shows an example of a clutch system of a hydraulic pressure type, a clutch master cylinder 103 operated by a clutch pedal 101 is connected to a clutch release cylinder 107 via a hose 105, and a pushrod 109 of the clutch release cylinder 107 is connected to a release fork 111.

That is, an operation process originated from the clutch pedal 101 acts on a clutch disk 115 via the clutch master cylinder 103, the hose 105, the clutch release cylinder 107, the clutch fork 111, and the clutch release bearing 113, thereby cutting off power transmission.

In such a conventional clutch system, shock noise is generated in a driving system when acceleration is performed by shifting gears just after an engine starting or when acceleration is performed under great torque by shifting gears while a vehicle runs. Such noise is caused by an energy collision generated by a collision of engine rotation energy and vehicle weight energy (i.e., weight of a vehicle and driving inertia energy of a vehicle). Such noise is amplified by a transmission, a propeller shaft, a rear axle, and the like, and is then transmitted to a vehicle body.

If a driver depresses the clutch pedal 101 with a full stroke, which means a stroke including an effective stroke of a clutch pedal of about 30 to 35 mm allowing an engagement of a clutch gear, the clutch disk 115 is completely separated from a friction plate 119 of a flywheel 117. In such a state, if the clutch pedal 101 is released, the clutch disk 115 in a stopped state contacts the rotating friction plate 119 of the flywheel 117 in an axial direction by a diaphragm spring 123 on a clutch cover 121, and this causes an energy collision generated in the clutch system.

That is, as a gap between the flywheel 117 and the clutch disk 115 becomes greater, a speed of the clutch disk 115 at the moment of contacting the friction plate 119 of the flywheel 117 becomes faster, and contact shock in an axial direction becomes also greater. Therefore, the contact shock between the clutch disk 115 and the friction plate 119 of the flywheel 117 in an axial direction is amplified by rotation energy of a driving system, thereby generating energy collision noise.

In the case in which a difference between rotation energy of an engine and weight energy of a vehicle is relatively great such as the case acceleration is performed just after engine starting or acceleration is performed under great torque by gear shifting wile a vehicle runs, if a gap between the clutch disk 15 and the friction plate 119 of the flywheel 117 is minutely regulated by minimizing an effective stroke of the clutch pedal 101 for an engagement of a clutch gear, a contact speed of the clutch disk 115 and the flywheel 117 can be minimized, and thereby contact shock in axial direction can be minimized so that noise caused by energy collision in the driving system can be reduced.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device for varying a stroke of a clutch pedal having advantages of varying an effective stroke of a clutch pedal depending on a vehicle speed signal and an engine RPM signal thereby preventing energy collision noise of a driving system.

An exemplary device for varying a stroke of a clutch pedal according to an embodiment of the present invention is applied to a pedal unit of a clutch system of a manual transmission comprising a mounting bracket and a pedal rod, an upper end of the pedal rod being hingedly connected to the mounting bracket, the pedal rod being hingedly connected to an operating rod of a clutch master cylinder, the clutch pedal being coupled to a lower end of the pedal rod, and includes: a stopper unit formed at one side of the mounting bracket; and an actuator formed at one side of the pedal rod corresponding to the stopper unit, a stroke adjust lever being provided to a rotating shaft of the actuator, the actuator rotating the stroke adjust lever with respect to the stopper unit by a control signal of a controller thereby varying an effective stroke of the clutch pedal.

The stopper unit may include: a nut welded to one side of the mounting bracket; and a stopper bolt engaged with the nut facing the stroke adjust lever.

The actuator may include an electric motor rotating the stroke adjust lever by a specific angle in response to a control signal of the controller.

The controller may include an engine control unit receiving signals from a vehicle speed sensor and an engine RPM sensor and outputting a driving signal to the actuator such that the stroke adjust lever is capable of contacting the stopper unit if a converted difference between a vehicle speed and an engine RPM is greater than or equal to a predetermined value.

DETAILED DESCRIPTION OF THE EMBODIMENTS

An exemplary embodiment of the present invention will hereinafter be described in detail with reference to the accompanying drawings.

Figure 1:
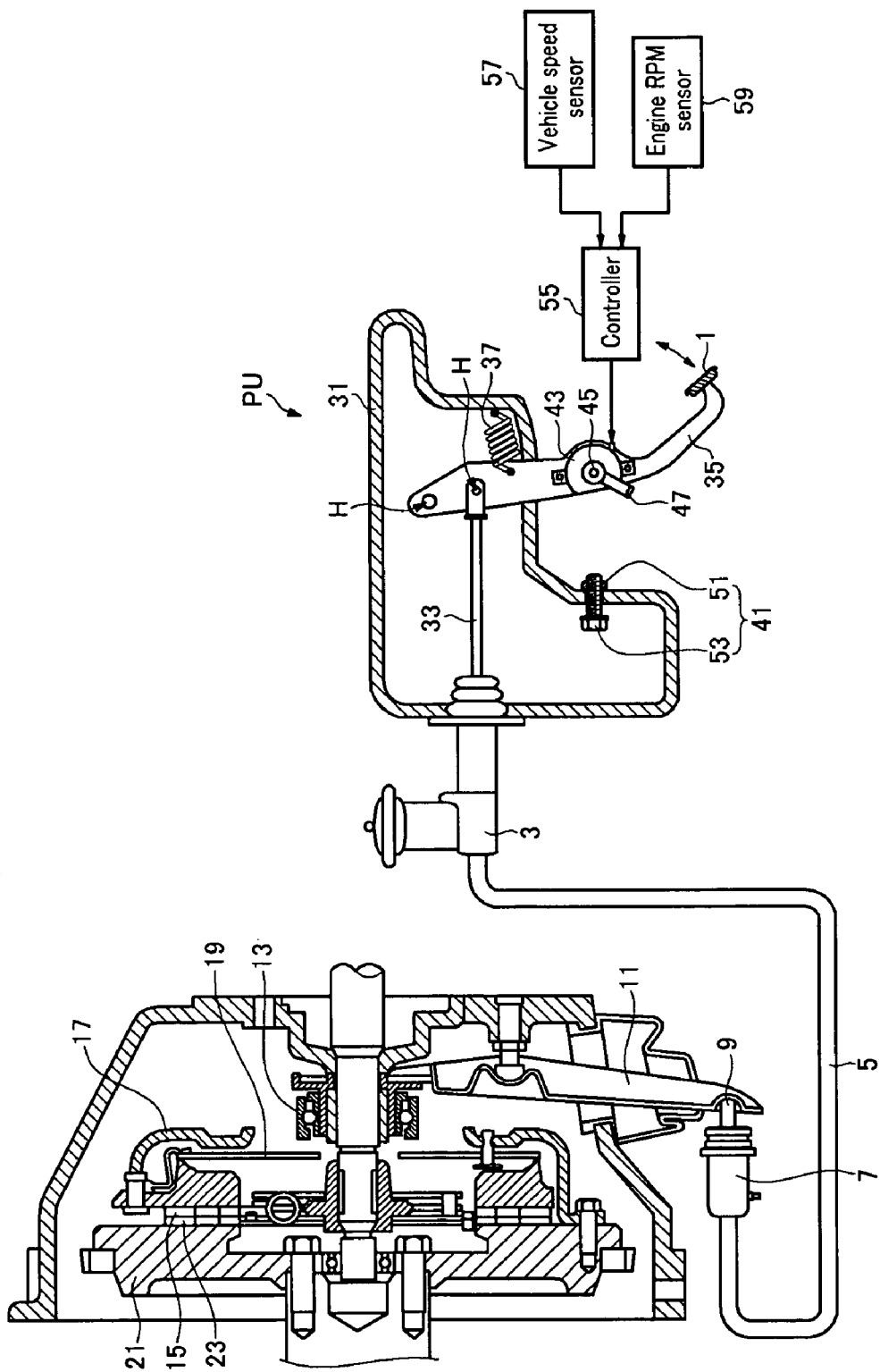
FIG. 1 shows a clutch system of a manual transmission to which a device for varying a stroke of a clutch pedal according to an exemplary embodiment of the present invention.
Figure 2:
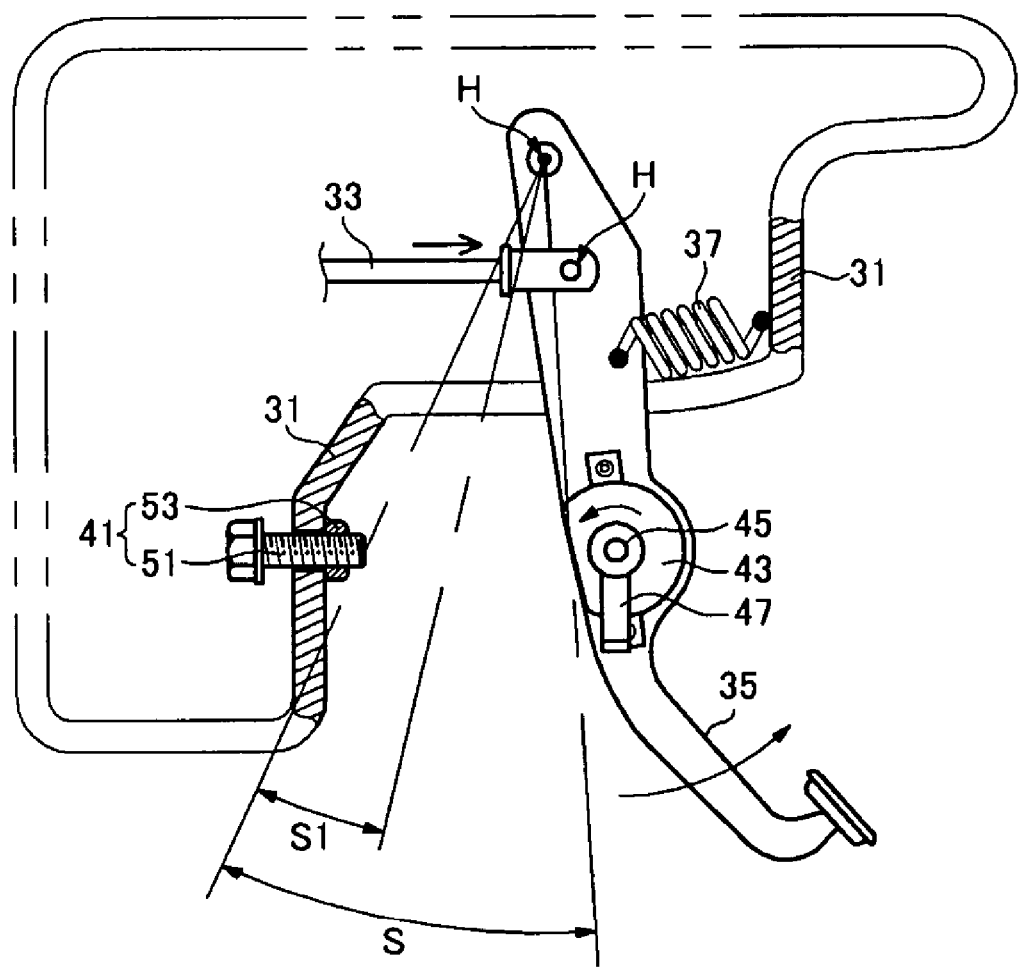
FIG. 2 shows a state of a pedal unit before a device for varying a stroke of a clutch pedal according to an exemplary embodiment of the present invention operates.

FIG. 1 shows a clutch system of a manual transmission to which a device for varying a stroke of a clutch pedal according to an exemplary embodiment of the present invention.

As shown in FIG. 1, in a clutch system to which a device for varying a stroke of a clutch pedal according to an exemplary embodiment of the present invention, a clutch master cylinder 3 operated by a clutch pedal 1 is connected to a clutch release cylinder 7 via a hose 5, and a pushrod 9 of the clutch release cylinder 7 is connected to a release fork 11.

That is, an operating process originated from a clutch pedal 1 acts on a diaphragm spring 19 on a clutch cover 17 pushing a clutch disk 15 via the clutch master cylinder 3, the hose 5, the clutch release cylinder 7, the clutch fork 11, and a clutch release bearing 13, so that the clutch disk 15 is separated from a friction plate 23 of a flywheel 21, and thereby cutting off power transmission.

In such a clutch system, a pedal unit PU to which the clutch pedal 1 is provided includes a mounting bracket 31 fixed to a vehicle body and a pedal rod 35. An upper end of the pedal rod 35 is hingedly connected to the mounting bracket 31 via a hinge point H, the pedal rod 35 is hingedly connected to an operating rod 33 of the clutch master cylinder 3 via a hinge point H, and the clutch pedal 1 is coupled to a lower end of the pedal rod 35.

In addition, a return spring 37 is installed between the pedal rod 35 and the mounting bracket 31 thereby providing return elastic force to the pedal rod 35.

In a device for varying a stroke of a clutch pedal according to an embodiment of the present invention applied to the above-mentioned pedal unit PU of a clutch system, a stopper unit 41 is formed at one side of the mounting bracket 31, an actuator 43 generating torque is formed at one side of the pedal rod 35, and a stroke adjust lever 47 is installed to a rotating shaft 45 of the actuator 43 such that the stroke adjust lever 47 operates in response to the stopper unit 41.

The actuator 43 is configured to vary an effective stroke of the clutch pedal 1 by rotating the stroke adjust lever 47 with respect to the stopper unit 41 depending on a control signal of a controller 55.

The stopper unit 41 includes a nut 51 fixed to one side of the mounting bracket 31 by welding, and a stopper bolt 53 engaged to the nut 51 facing the stroke adjust lever 47.

That is, it is configured that an effective stroke of the clutch pedal 1 is regulated by an amount of engagement of the stopper bolt 53.

In addition, the actuator 43 may be realized as an electric motor rotating the stroke adjust lever 47 by a specific angle in both directions in response to a control signal of the controller 55.

In addition, the controller 55 includes an engine control unit ECU receiving signals from a vehicle speed sensor 57 and an engine RPM sensor 59 and outputting a driving signal to the actuator 43 such that the stroke adjust lever 47 is capable of contacting the stopper unit 41 if a converted difference between a vehicle speed and an engine RPM is greater than or equal to a predetermined value.

At this time, as shown in FIG. 22, the effective stroke S1 means a stroke range of the clutch pedal 1 in which a clutch gear can be engaged with respect to a total stroke S of the clutch pedal 1, and the effective stroke S1 of the clutch pedal 1 can be set initially as about 30 to 35 mm in a pedal travel.

Figure 3:
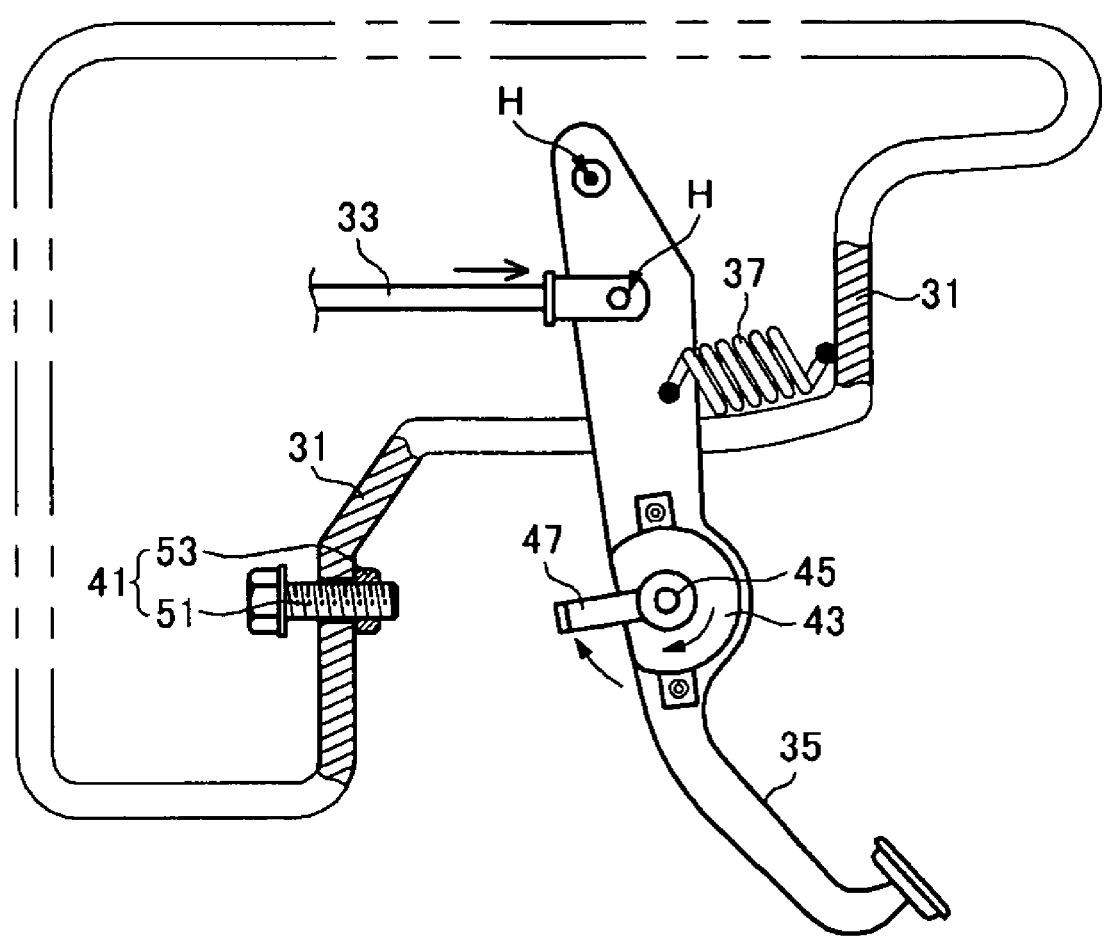
FIG. 3 and FIG. 4 respectively show a state of a pedal unit while a device for varying a stroke of a clutch pedal according to an exemplary embodiment of the present invention operates and a varied effective stroke of a clutch pedal at that time.
Figure 4:
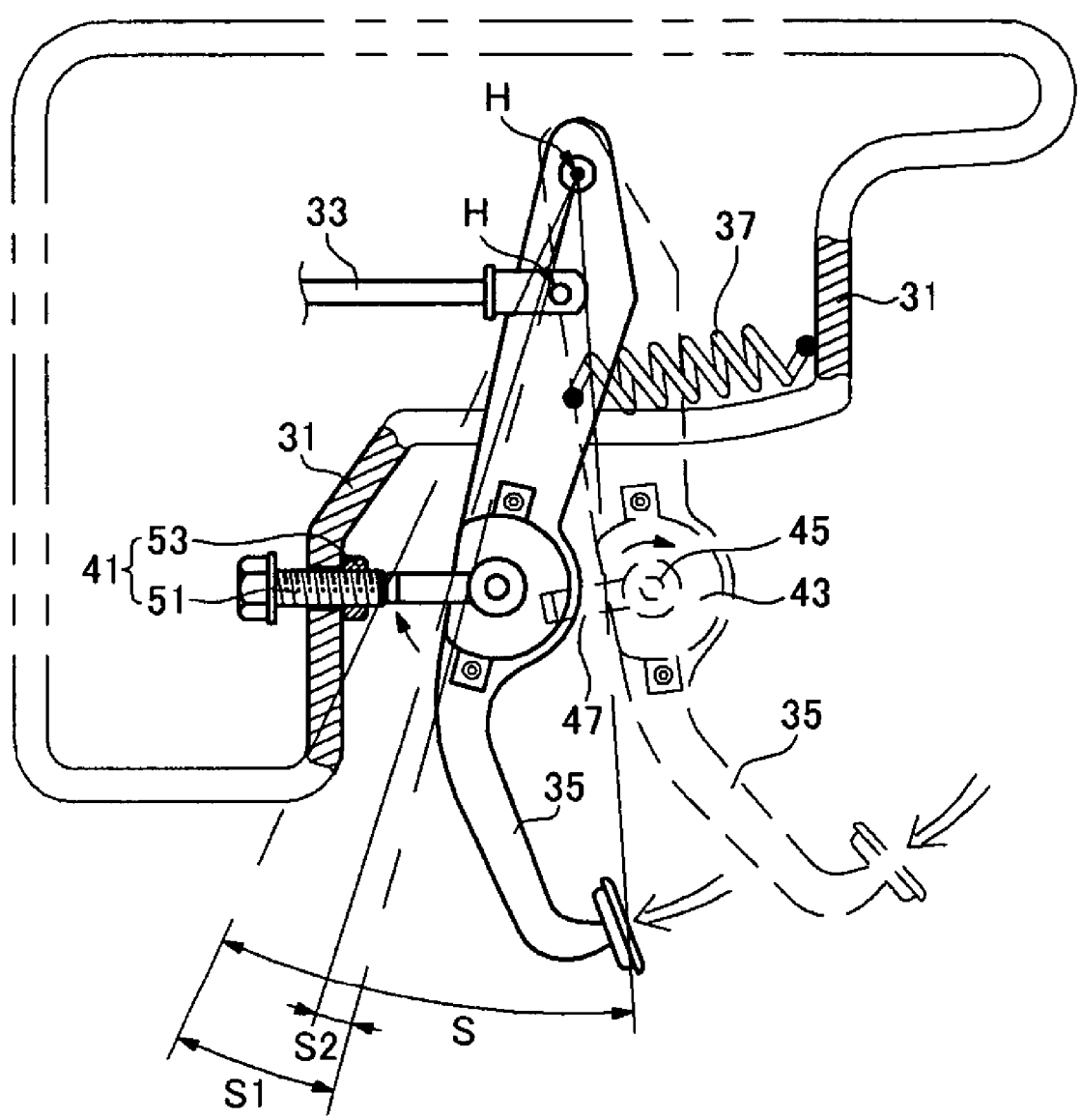
Figure 5:
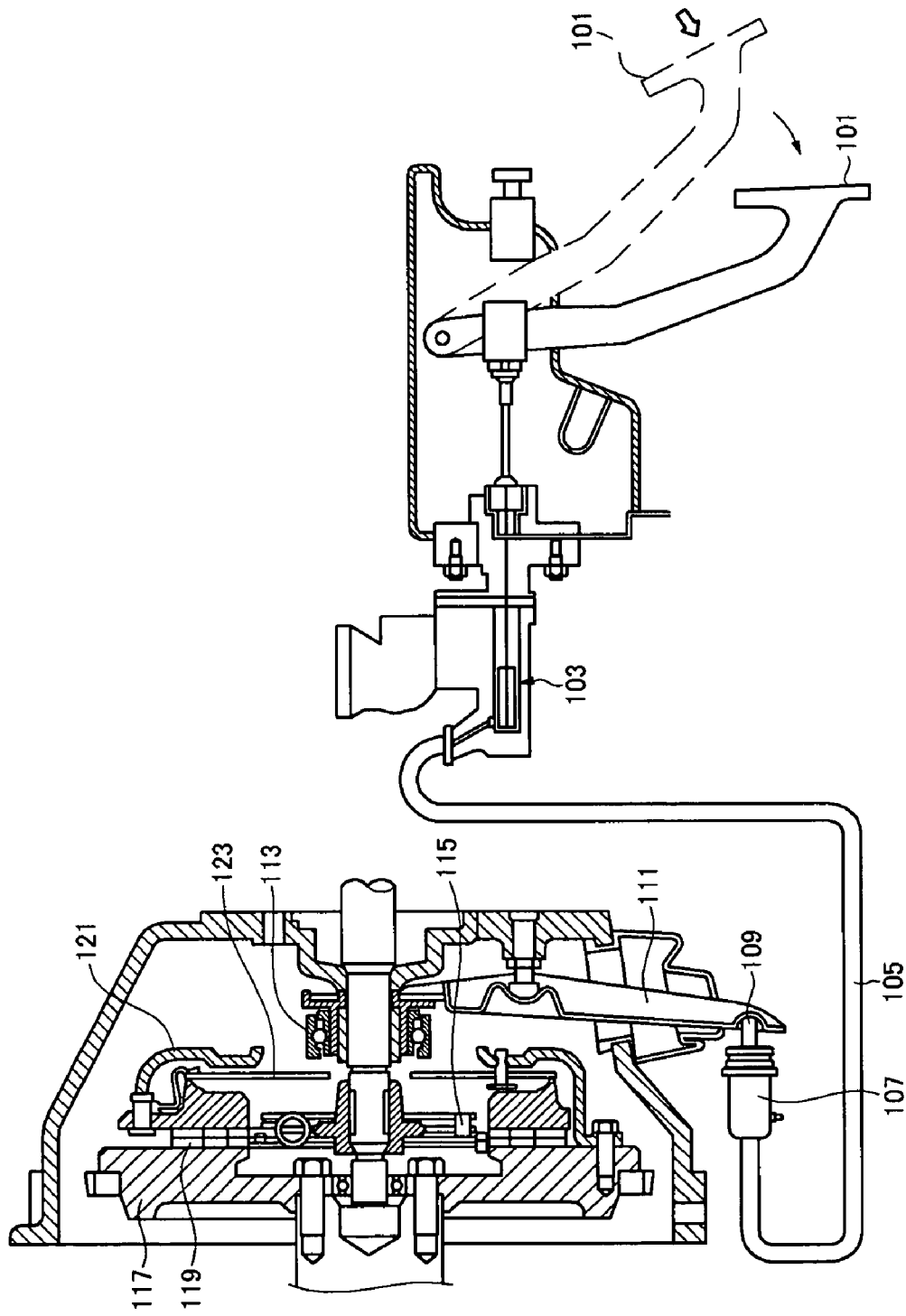
FIG. 5 is a schematic diagram of a conventional clutch system of a manual transmission.

If the actuator 43 operates such that the stroke adjust lever 47 is rotated toward the stopper bolt 53 as shown in FIG. 3, the regulated effective stroke S2 of the clutch pedal 1 may be about 1 to 3 mm in a pedal travel distance when the clutch pedal 1 is fully depressed by a driver, as shown in FIG. 4.

That is, as stated above, in the case that the effective stroke of the clutch pedal 1 is changed from S1 to S2 in a range of 1 to 3 mm, a gap between the clutch disk 15 and the friction plate 23 of the flywheel 21 is minimized such that they contact each other while slipping very little in a degree in which a durability of a clutch is not affected, when the clutch pedal 1 is fully depressed.

An operation of a device for varying a stroke of a clutch is as follows. If a converted difference between a vehicle speed and an engine RPM while a vehicle runs is less than a predetermined value, the controller 55 controls the actuator 43 to be its initial state such that the stroke adjust lever 47 does not contact the stopper bolt 53. Accordingly, the clutch pedal 1 has its initial effective stroke S1 (about 30 to 35 mm).

At this time, the converted difference between the vehicle speed and the engine RPM means a difference between a converted engine RPM, which is calculated from a vehicle speed at a current shift speed, and a current engine RPM. Here, the converted engine RPM is a value obtained by converting the vehicle speed into the engine RPM corresponding to a current shift-speed. In more detail, an RPM of a wheel can be calculated from the vehicle speed, and thus a corresponding converted engine RPM can be calculated on the basis of the wheel RPM considering the current shift-speed. The converted difference means a difference between the converted engine RPM and the current engine RPM. The predetermined value can be arbitrarily set by a person of ordinary skill in the art, and for example, it can be determined from a map table stored in the controller.

On the other hand, if a vehicle speed is detected as 0 from the vehicle speed sensor 57 and the engine RPM sensor while an engine operates and an engine RPM is in an idle RPM range, or if the converted difference between the vehicle speed and the engine RPM is greater than or equal to the predetermined value, the controller 55 controls the actuator 43 to rotate such that the stroke adjust lever 47 may be able to contact the stopper bolt 53. Accordingly, the effective stroke of the clutch pedal 1 is regulated as S2 (about 1 to 2 mm).

If an effective stroke of the clutch pedal 1 is regulated to S2, a stroke of the clutch pedal 1 for an engagement of a clutch gear is minimized and thereby a gap between the clutch disk 15 and the friction plate 23 of the flywheel 21 is regulated such that they can minutely slip, when acceleration is performed by shifting gears just after engine starting or acceleration is performed in a state that the converted difference between the vehicle speed and the engine RPM is great, i.e., when a difference between engine rotation energy and vehicle weight energy is great. In addition, contact speed of the clutch disk 15 and the friction plate 23 of the flywheel 21 can also be minimized.

Therefore, contact shock in an axial direction between the clutch disk 15 and the friction plate 23 of the flywheel 21 can be minimized, so that noise caused by energy collision in a driving system can be minimized.

As stated above, a device for varying a stroke of a clutch pedal according to an embodiment of the present invention varies an effective stroke of a clutch pedal in response to a vehicle speed signal and an engine RPM signal. Accordingly, contact shock in an axial direction between the clutch disk and the friction plate of the flywheel can be minimized, so that noise caused by energy collision in a driving system can be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for varying a stroke of a clutch pedal applied to a pedal unit of a clutch system of a manual transmission comprising a mounting bracket and a pedal rod, an upper end of the pedal rod being hingedly connected to the mounting bracket, the pedal rod being hingedly connected to an operating rod of a clutch master cylinder, the clutch pedal being coupled to a lower end of the pedal rod, comprising:
   a stopper unit formed at one side of the mounting bracket; and
   an actuator formed at one side of the pedal rod corresponding to the stopper unit, a stroke adjust lever being provided to a rotating shaft of the actuator, the actuator rotating the stroke adjust lever with respect to the stopper unit by a control signal of a controller thereby varying an effective stroke of the clutch pedal.

2. The device of claim 1, wherein
the stopper unit comprises:
a nut welded to one side of the mounting bracket; and
a stopper bolt engaged with the nut facing the stroke adjust lever.

3. The device of claim 1, wherein
the actuator comprises an electric motor rotating the stroke adjust lever by a specific angle in response to a control signal of the controller.

4. The device of claim 1, wherein
the controller comprises an engine control unit receiving signals from a vehicle speed sensor and an engine RPM sensor and outputting a driving signal to the actuator such that the stroke adjust lever is capable of contacting the stopper unit if a converted difference between a vehicle speed and an engine RPM is greater than or equal to a predetermined value.

5. The device of claim 1, wherein:
the stopper unit comprises a nut welded to one side of the mounting bracket and a stopper bolt engaged to the nut facing the stroke adjust lever;
the actuator comprises an electric motor rotating the stroke adjust lever by a specific angle in response to a control signal of the controller; and
the controller comprises an engine control unit receiving signals from a vehicle speed sensor and an engine RPM sensor and outputting a driving signal to the actuator such that the stroke adjust lever is capable of contacting the stopper unit if a converted difference between a vehicle speed and an engine RPM is greater than or equal to a predetermined value.

* * * * *